United States Patent [19]

Corso et al.

[11] 4,120,033
[45] Oct. 10, 1978

[54] APPARATUS AND METHOD FOR DETERMINING PUMPING SYSTEM HEAD CURVES

[75] Inventors: Anthony Bruce Corso; James Burton Rishel, both of Cincinnati, Ohio

[73] Assignee: Corporate Equipment Company, Cincinnati, Ohio

[21] Appl. No.: 756,909

[22] Filed: Jan. 4, 1977

[51] Int. Cl.$^2$ .................. G01L 13/00; G01D 9/02
[52] U.S. Cl. .................. 364/510; 73/199; 73/712; 137/42; 137/551; 364/558; 417/63
[58] Field of Search .................. 235/151.34; 137/38, 137/42, 551, 593, 14; 73/168, 195, 199, 299, 301-303, 391, 196; 417/53, 63; 364/509, 510

[56] References Cited

U.S. PATENT DOCUMENTS

| | | | |
|---|---|---|---|
| 3,677,092 | 7/1972 | Guarino | 417/63 |
| 3,752,393 | 8/1973 | Moseley | 235/151.34 |
| 3,779,457 | 12/1973 | Cornyn, Jr. et al. | 417/63 |

OTHER PUBLICATIONS

Perkins, H., College Physics, third edition, Prentice Hall, Inc. (1948) pp. 128-132.
Rouse, H., Elementary Mechanics of Fluids, Wiley & Sons, Inc. (1946) pp. 160-162.
Rishell, J. B., "The Case for Variable-Speed Pumping Systems", *Plant Engineering*, Nov. 28, 1974, pp. 68-70.
Rishell, J. B., "Selecting Pumps for Secondary Chilled Water Systems", *Heating/Piping/Air Conditioning*, Apr. 1974, pp. 1-8.

*Primary Examiner*—Malcolm A. Morrison
*Assistant Examiner*—Errol A. Krass
*Attorney, Agent, or Firm*—Biebel, French & Nauman

[57] ABSTRACT

There is disclosed apparatus and method for determining pumping head requirements for an operating pumping system by subtracting a desired delivery head or pressure from an actual head. The difference represents overpressure, and this overpressure is subtracted from a measured pump total dynamic head to establish the pumping head requirement of the system. The pumping head requirement data is recorded together with other data indicating a measured fluid flow rate. The data so recorded is in a form for plotting a system head curve. Once the system head curve is available it is possible to modify the supply system so as to avoid pumping at a pressure in excess of that which may be required for any given flow rate condition. Such avoidance of overpressure pumping produces an energy saving in the operation of the pumping system.

7 Claims, 6 Drawing Figures

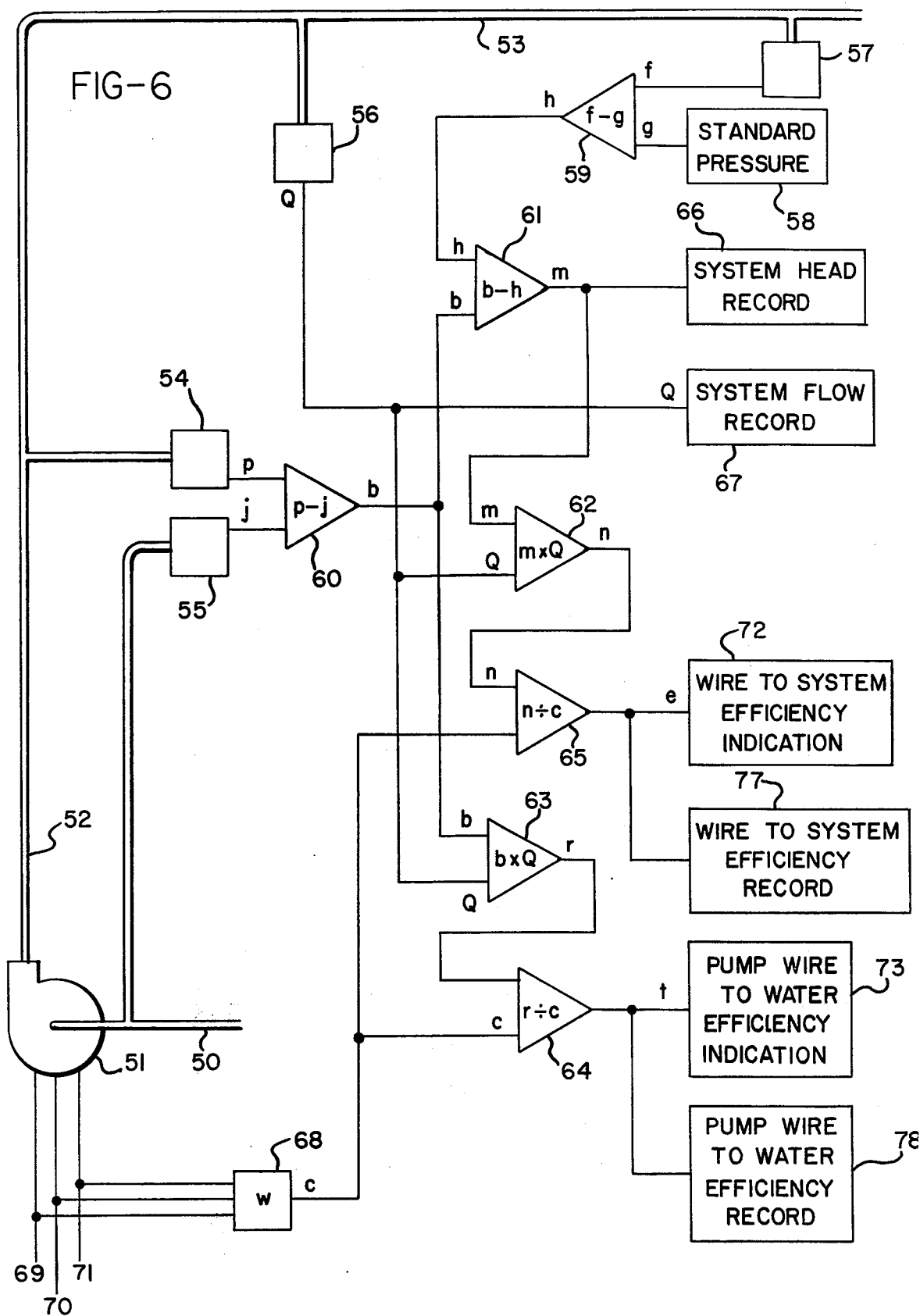

APPARATUS AND METHOD FOR DETERMINING PUMPING SYSTEM HEAD CURVES

BACKGROUND OF THE INVENTION

Overpressuring is one of the major causes of energy waste in water systems. Many water systems function adequately but at pressures in excess of those needed to move water through the system. This energy waste is commonly suffered by special purpose systems designed to supply water, or other working liquid, to an elevated structure such as an office building.

For example, the typical high-rise office building has its own pumping system, which is fed by water delivered from a standard city water system. The building pumping system takes this water and pumps it up to a delivery point to an elevated location, where it is used. The pumping system must add sufficient energy to the stream to elevate the water and overcome frictional losses enroute to the delivery point. Upon arrival at the delivery point the water must be pressurized to a pressure sufficient for the intended use.

In general, it may be difficult to predict the actual flow and head requirements for the pumping system, and therefore the pumps are frequently overdesigned. Typically the pump system designer is familiar with system head curves, which relate pump head requirements to system flow but he must use empirical data and formulas to calculate the frictional losses which will be encountered in this system. Moreover, the frictional losses, and hence the system head curve, will vary from time to time with aging of the system and incorporation of minor modifications in the lines. Thus the calculated system head curve heretofore may have differed appreciably from the actual system head curve of a water system.

SUMMARY OF THE INVENTION

The apparatus and method of this invention enables the generation of data for easy and accurate plotting of head curves governing an open or closed pumping system. The basic data is acquired by establishing a desired pressure at the delivery point and subtracting this pressure from the actual pressure measured at that point. The difference between these two figures represents overpressure, and this overpressure is subtracted from the pump total dynamic head as measured at the pumping station. Actual flow rates are correlated with the pressure measurements so as to establish the data required for head curve plotting. Thus there is no need to measure or estimate frictional losses or energy requirements for the existing system.

The system head curve data, which is generated in accordance with this invention, tells at a glance whether or not the pumping system is creating excessive pressure for any given flow condition and indicates actual pumping system requirements for the entire range of expected flow conditions. Thus if the pumping system comprises an arrangement of fixed speed or variable speed pumps, it may be adjusted for optimum energy saving operation. Alternatively, the data may indicate that a pump should be removed and replaced by a smaller pump. Continued system monitoring in accordance with this invention enables optimization throughout the entire life of that system.

It is therefore an object of this invention to provide apparatus and method for conserving energy in a pumping system.

Another object of this invention is to provide improved apparatus and method for generation of pumping system head curve data.

Still another object of this invention is to determine pumping system requirements for hydraulic systems.

Another object of this invention is to reduce maintenance and increase the useful life of pumps and lines.

A further object of the invention is to reduce water leakage through reduction of overpressuring of system.

Other and further objects and advantages of the invention will be apparent from the following description, the accompanying drawings and the appended claims.

BRIEF DESCRIPTION OF THE DRAWINGS

FIG. 6 is a schematic diagram of an arrangement for recording head band data and efficiency data for an open system.

DESCRIPTION OF THE PREFERRED EMBODIMENTS

Figure 1:
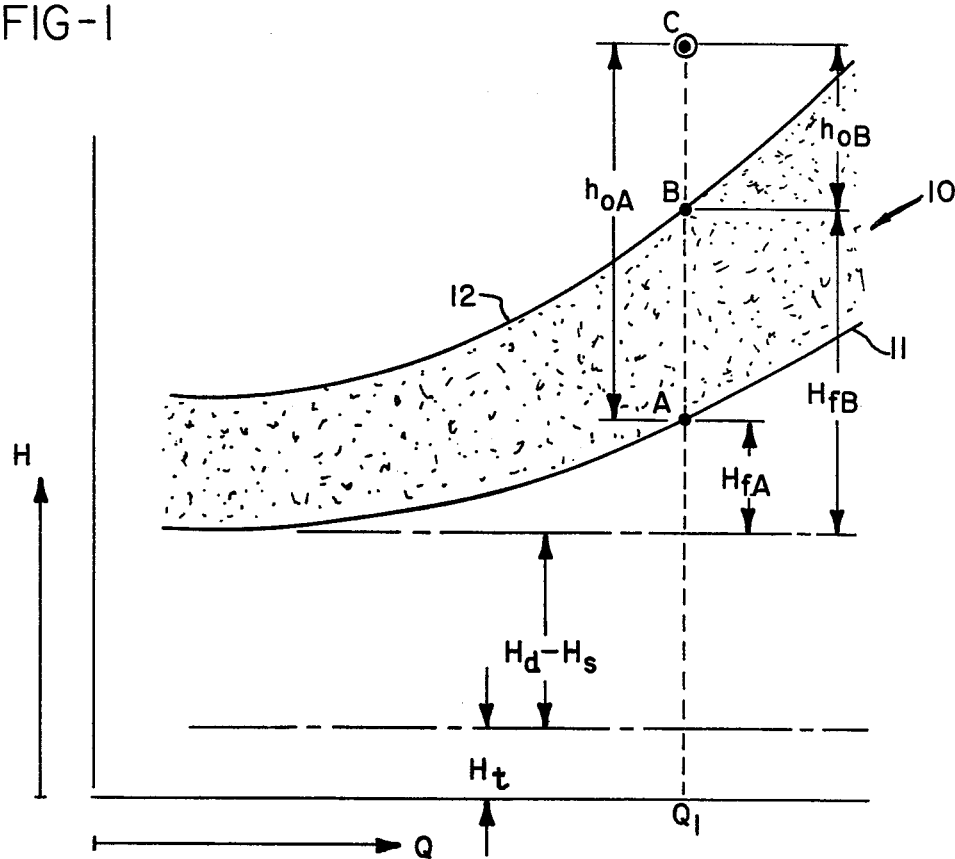
FIG. 1 is an illustration of a system head band.

Referring to FIG. 1, there is illustrated a system head band 10 bounded by a first head curve 11 and a second head curve 12. The first head curve 11 may be taken as representing the head curve for a newly constructed pumping system. Later, as corrosion and modifications have increased pumping requirements, the curve 12 may become the effective system head curve. During the life of this system the head curve may be anywhere within the band 10 due to frictional variations and suction variations.

A point on any head curve within the band 10 represents a head requirement, H, for the corresponding indicated fluid flow rate, Q. The head H represents the true required total dynamic head of the system.

FIG. 1 presents a typical flow condition at a flow rate $Q_1$. For a system operating at a point A along the head curve 11, the head H is given by the equation $$H = H_t + (H_d - H_s) + H_{fA}$$

where:
- $H_t$ = head required to elevate the fluid
- $H_d$ = desired head at the distribution location
- $H_s$ = available suction head
- $H_{fA}$ = frictional loss for the operating condition indicated by point A.

A similar equation applies to operation along the head curve 12, where the flow condition $Q_1$ has an intercept point B. The frictional head requirement associated with operation at point B is $H_{fB}$.

FIG. 1 shows that if the system operates along the curve 11 and the pump produces a flow rate $Q_1$ at a head represented by the point C, then there is a pumping overpressure represented by the distance $h_{oA}$. The same pump produces an overpressure $h_{oB}$ for a system operating along the head curve 12. Any pumping overpressure represents energy waste, and it is most desirable therefore to operate along that system head curve which presently may be applicable for the system.

Figure 2:
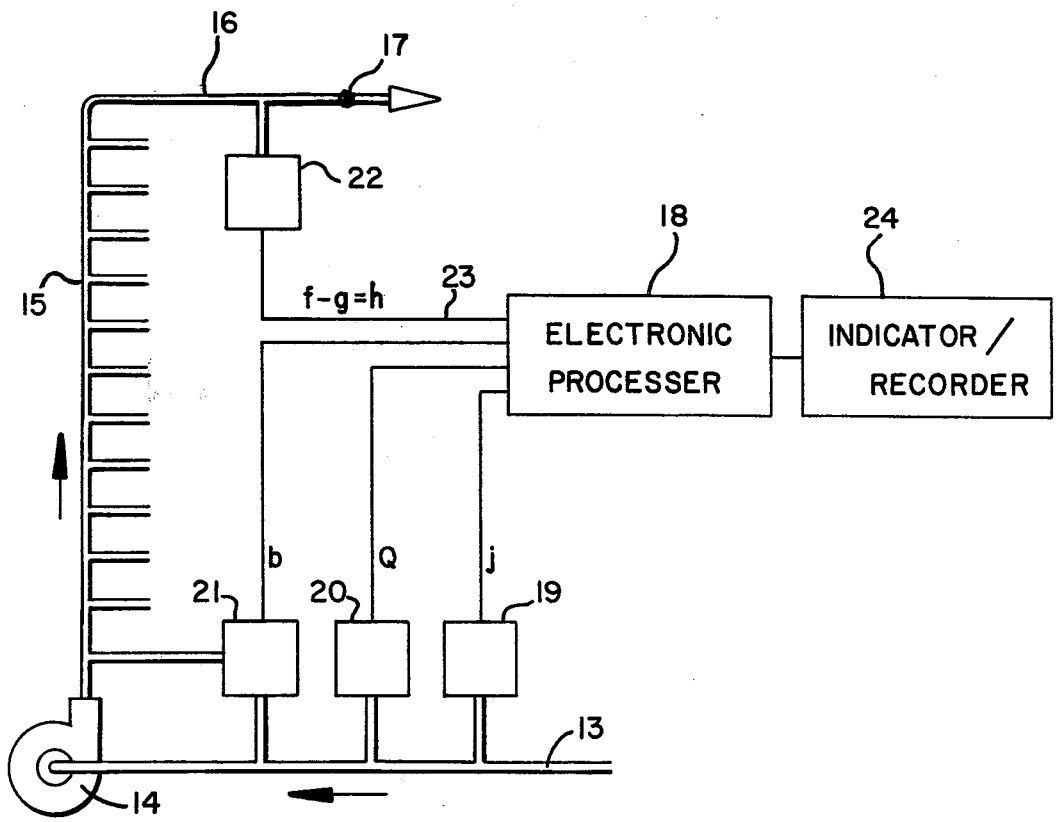
FIG. 2 is a block diagram of an open pumping system.

FIG. 2 illustrates a typical open system wherein a supply line 13 provides water to a pump 14. The pump 14 accepts the water, which may arrive at a suction pressure $j$, and pumps it into a discharge line 15 at a discharge pressure $p$. Pump 14 produces a total dynamic head $b$ (commonly known as TDH), which is the difference between $p$ and $j$.

The water in discharge line 15 flows upwardly to an elevated line 16, which in turn provides flow to a delivery point 17. An electronic processor 18 is connected to a first transmitter 19 which measures suction pressure $j$, a second transmitter 20 which measures flow rate Q and a third transmitter 21 which measures the pump total dynamic head, $b$. A measuring unit 22 is located near the delivery point 17 for measuring the local overpressure $f-g$ as hereinafter described, and an electrical line 23 transmits the measurement from transmitter 22 to processor 18. A recorder 24 records head curve data as hereinafter described.

Figure 3:
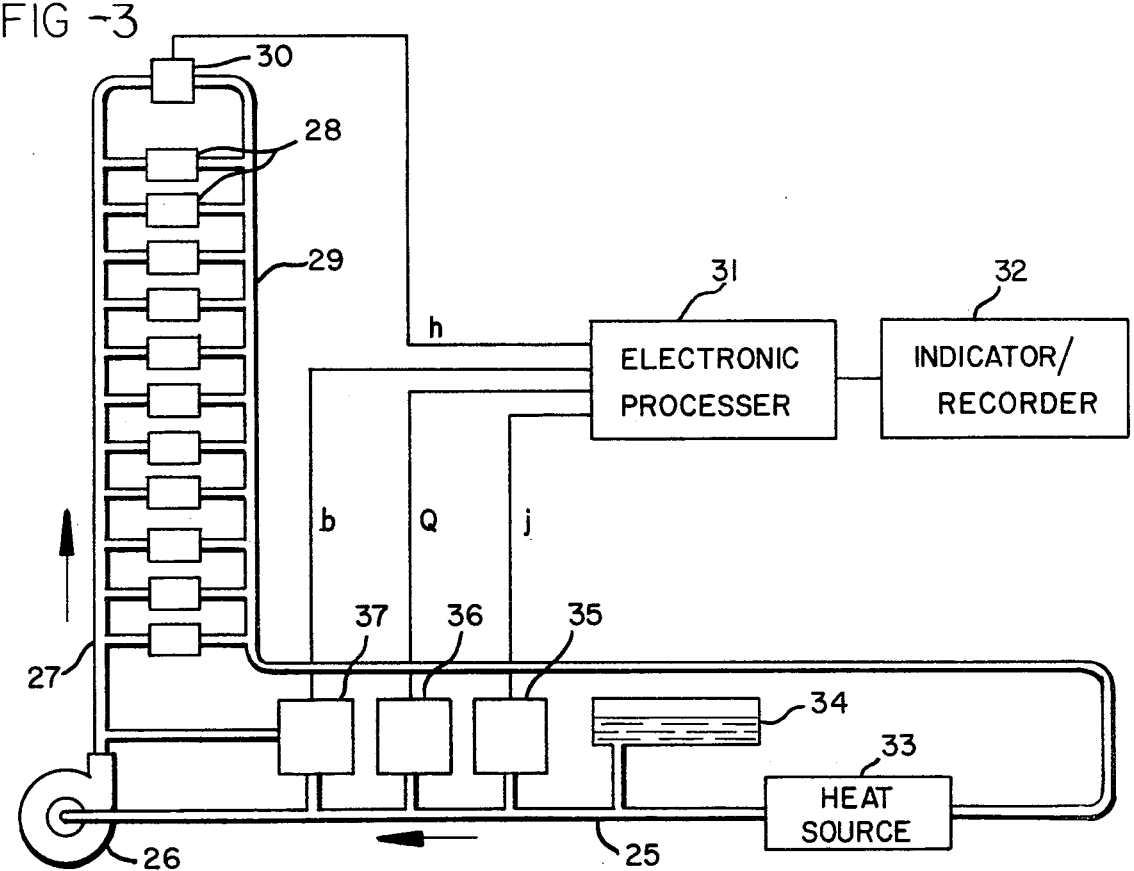
FIG. 3 is a block diagram of a closed pumping system.

FIG. 3 is a block diagram for a typical closed system. In the closed system of FIG. 3, which might represent a chilled or hot water system, the fluid returns from the distribution point to the supply point. The closed system has a suction line 25, a pump 26, and a discharge line 27. A series of working elements 28 are arranged in parallel and transfer working fluid from discharge line 27 into a return line 29. A measuring unit 30 measures the pressure drop between discharge line 27 and return line 29 and compares this with a desired pressure drop.

The closed system also has an electronic processor 31, a recorder 32, a heat source 33 and an expansion tank 34. A transmitter 35 measures suction pressure, another transmitter 36 measures flow rate, and a third transmitter 37 measures pump total dynamic head.

Figure 4:
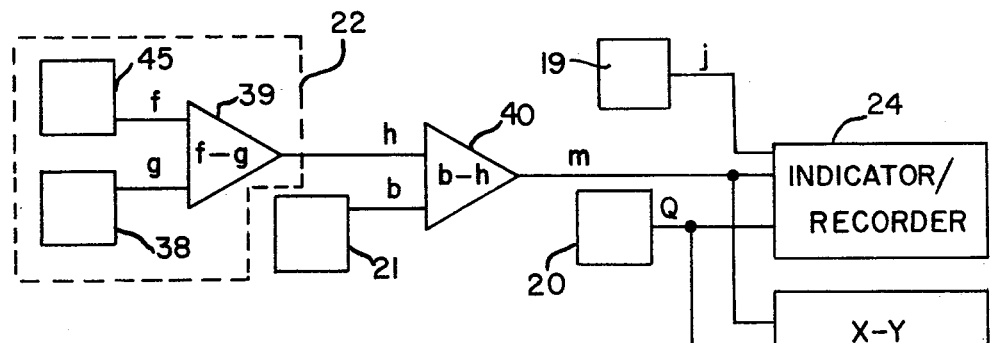
FIG. 4 is a schematic diagram of a simplified arrangement for recording head band data in an open system.

FIG. 4 presents a simplified schematic diagram representing data processing apparatus for the open system of FIG. 2. As illustrated therein, an operational amplifier 39 is connected for generating an overpressure output signal $h$ representing the difference between a delivery pressure $f$ measured by a transmitter 45 and a desired pressure $g$ indicated by a potentiometer 38. A second operational amplifier 40 generates an output signal $m$ representing the difference between the output of operational amplifier 39 and the total dynamic head $b$ measured by transmitter 21. The output of operational amplifier 40 is applied to indicator 24 and also to an $x$-$y$ plotter 75. The corresponding flow rate Q, as measured by transmitter 20 is also applied to indicator 24 and $x$-$y$ plotter 75. The suction pressure $j$ is not used for calculations in this simplified arrangement but is recorded.

An examination of the apparatus of FIG. 4 shows that the computed system head $m$ is given by the equation $$m = b - (f-g)$$

Since the quantity $f-g$ is a measure of overpressure at the delivery location, $m$ is the total dynamic head actually required from pump 14 at the indicated flow rate Q.

Relating the above calculations to FIG. 1 and assuming operation of a new system (i.e. along head curve 11) at a flow rate $Q_1$, it will be seen that $$m = H_t + H_d + H_{fA} - H_s$$

Thus while the quantity $H_{fA}$ continues to remain unknown, pump requirements are known to a fairly high degree of accuracy.

Figure 5:
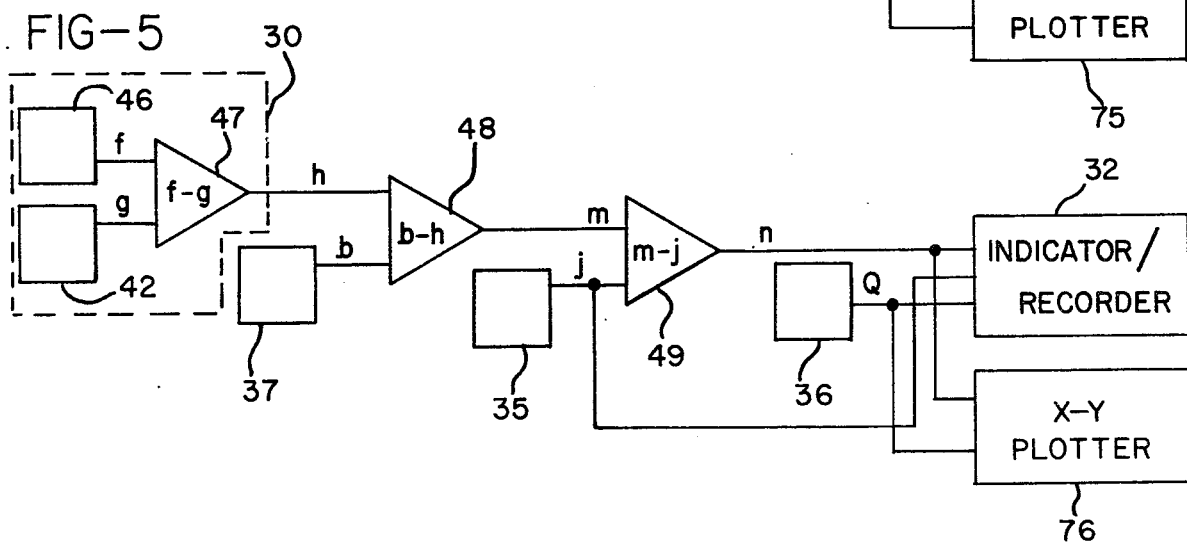
FIG. 5 is a schematic diagram of a simplified arrangement for recording head band data in a closed system.

Apparatus for recording head band data for the closed system of FIG. 3 is illustrated in FIG. 5. The recording apparatus includes a potentiometer 42 for indicating a desired pressure drop $g$, a transmitter 46 for measuring actual pressure drop $f$, and a comparator 47, all incorporated within the measuring unit 30. The output, $h$, from comparator 47 and a total dynamic head measurement, $b$, from transmitter 37 are applied to a second comparator 48, which in turn is connected to an operational amplifier 49. Amplifier 49 also receives a suction pressure measurement, $j$, from transmitter 35. The output from comparator 49, $n$, and measured flow rate output, Q, from transmitter 36 are applied to recorder 32 and $x$-$y$ plotter 76. Suction pressure, $j$, is also recorded.

FIG. 6 illustrates a somewhat more elaborate arrangement for recording open system head band data.

As illustrated in FIG. 6 a pump 51 is supplied with water by a line 50. Pump 51 discharges into a discharge line 52 which is connected to a delivery line 53. A transmitter 54 is connected to line 52 to produce an output signal, $p$, representing pump discharge pressure. The output signal, $s$, from a suction pressure transmitter 55 is subtracted from signal $p$ in comparator 60 to produce output signal, $b$. A third transmitter 56 has an output Q representing fluid flow rate.

A signal $f$ representing the actual pressure in the delivery line 53 is generated by another transmitter 57 for comparison with a signal $g$ representing the desired pressure in the delivery line. The signal $g$ is generated by a potentiometer 58, and the comparison is made by comparator 59.

The system illustrated in FIG. 6 includes operational amplifiers 61 through 65 for receiving the above-mentioned signals and producing three output signals $m$, $e$ and $t$. The signal $m$ represents required total dynamic head for head curve plotting. The signal $m$ is applied to a recorder 66 for recording in correspondence with recordal of the signal Q by another recorder 67. All amplifier gains are adjusted for dimensional consistency of the units being indicated.

The pump 51 is powered by three-phase current applied to power lines 69 through 71. A watt meter 68 is connected to lines 69 through 71 and produces an output signal $c$ representing the power consumed by the pump 51. The signal $c$ is applied to operational amplifier 65 for use as a divisor as illustrated. Operational amplifier 65 has another input signal $n$ which is used as a dividend to produce an output signal $e$ representing the quotient or ratio of the two inputs. The signal $n$ is a pressure-flow rate product of the ideal system or the useful kinetic energy of the system. Since operational amplifier 65 divides the useful energy by the actual energy to the pump, the signal $e$ is a measure of the system efficiency. The value of the signal $e$ is indicated on indicator 72 and recorded on recorder 77.

The power consumption signal $c$ is also supplied to operational amplifier 64 for use in producing the output signal $t$. The signal $t$ represents the efficiency of pump 51 in converting electrical power to fluid kinetic energy in discharge line 52. A recorder 78 records output signal $t$, with a visual indication being made by indicator 73.

It will be understood that the method of this invention involves generation of system head curve data by decreasing measured actual head data an amount equal to overpressure at a delivery point. The overpressure at the delivery point is most conveniently determined by an electrical signal representing a desired pressure and electrically subtracting this signal from another electrical signal representing actual pressure at the delivery point. It will be appreciated that the equivalent operation may be performed by simply measuring the actual pressure in the delivery line in the presence of a mechanical or electrical bias representing the desired pressure.

For such an equivalent operation there would not be an electrical signal directly representing the desired pressure but the operation would in effect be the same. Furthermore, it will be appreciated that head curve data may be based upon either required total dynamic head developed by the pump or the required discharge pressure from the pump. Finally it is readily apparent that the invention is applicable to pumping systems for pumping fluids other than those specifically mentioned above. It particularly is applicable to systems which employ fans or blowers for moving gaseous fluids such as air.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. Recording apparatus for a fluid supply system comprising first measuring means for generating a first signal indicative of the actual pumping head at a supply point for said system, second measuring means for generating a second signal indicative of the actual fluid delivery pressure at a delivery point in said system, signal generating means for generating a third signal indicative of a desired fluid delivery pressure at said delivery point, combining means for combining said first, second and third signals to obtain a fourth signal indicative of said first signal reduced by an amount equal to the difference between said second and third signals, and first recording means for recording said fourth signal as an indication of a system head requirement.

2. Apparatus according to claim 1 further comprising a flow meter for generating a fifth signal indicative of the fluid flow supply rate accompanying aforesaid pumping head and fluid delivery pressure and second recording means for recording said fifth signal.

3. Apparatus according to claim 2 wherein said combining means comprises means for generating a sixth signal representing the difference between the pressures represented by said second and third signals and means for combining said sixth signal with said first signal to produce said fourth signal.

4. Apparatus according to claim 3 wherein said first signal represents total dynamic head delivered by a supply pump for said system.

5. Apparatus according to claim 2 further comprising means for generating an energy consumption signal, means for combining said fourth and fifth signals to produce a seventh signal indicative of the product of the values indicated by said fourth and fifth signals and third recording means responsive to said seventh signal and to said energy consumption signal for recording a computed system efficiency.

6. Apparatus for generating a pumping system head curve comprising means for making repeated measurements of the overpressure at a delivery point in said system, means for making a series of measurements of the head at a supply point for said system in correspondence with said overpressure measurements, means for measuring a series of flow rates from said supply point to said delivery point in correspondence with said overpressure measurements and said head measurements, means for subtracting said overpressure measurements from said head measurements to obtain a series of required head indications, and means for recording said required head indications against the corresponding measured flow rates to define said head curve.

7. Apparatus according to claim 6 wherein said overpressure measuring means comprises means for measuring the actual pressure at said delivery point, and subtracting therefrom a desired pressure at said point.

* * * * *